United States Patent [19]

Maddox

[11] 4,378,161
[45] Mar. 29, 1983

[54] OPTICAL SENSING SYSTEM FOR DETERMINING THE ANGULAR ORIENTATION OF WEFT THREADS

[75] Inventor: Edward L. Maddox, Lexington, Mass.

[73] Assignee: SW Industries, Inc., Providence, R.I.

[21] Appl. No.: 174,645

[22] Filed: Aug. 1, 1980

[51] Int. Cl.$^3$ .................................... G01N 21/89
[52] U.S. Cl. ............................ 356/430; 26/51.5; 250/562
[58] Field of Search ............ 356/238, 430; 250/562, 250/572; 26/51.5

[56] References Cited

U.S. PATENT DOCUMENTS

| | | | |
|---|---|---|---|
| 2,106,611 | 1/1938 | La Pierre | 26/51 |
| 2,106,612 | 1/1938 | La Pierre et al. | 26/52 |
| 2,196,893 | 4/1940 | Berry | 26/51 |
| 2,209,220 | 7/1940 | Berry | 26/51 |
| 2,311,406 | 2/1943 | Mansfield et al. | 26/51 |
| 2,427,753 | 9/1947 | Vose et al. | 26/52 |
| 2,492,737 | 12/1949 | Dunn | 26/52 |
| 2,587,224 | 2/1952 | Robertson | 26/51 |
| 2,623,262 | 12/1952 | Berry | 26/51 |
| 2,638,656 | 5/1953 | Tuttle et al. | 26/51 |
| 2,972,794 | 2/1961 | Saul et al. | 26/51.5 |
| 3,077,656 | 2/1963 | Mahlo | 26/51.5 |
| 3,169,193 | 2/1965 | Strang | |
| 3,192,595 | 7/1965 | Morton et al. | 26/51.5 |
| 3,193,688 | 7/1965 | Morton et al. | |
| 3,350,933 | 11/1967 | Smith | 73/159 |
| 3,517,204 | 6/1970 | Mahlo et al. | 26/51.5 |
| 3,554,656 | 1/1971 | Eicken | 356/238 |
| 3,633,037 | 1/1972 | Langenbeck | 26/51.5 |
| 3,636,598 | 1/1972 | Hannaway | 26/51.4 |
| 3,689,772 | 9/1972 | George et al. | 356/71 |
| 3,729,635 | 4/1973 | Shottenfeld et al. | 250/562 |
| 3,751,774 | 8/1973 | Hannaway | 26/51.4 |
| 3,836,254 | 9/1974 | Barringer | 356/310 |
| 4,248,533 | 2/1981 | Shimada | 356/238 |

FOREIGN PATENT DOCUMENTS

| | | |
|---|---|---|
| 54-88382 | 7/1979 | Japan. |
| 499753 | 1/1939 | United Kingdom. |
| 871325 | 6/1961 | United Kingdom. |
| 1003771 | 9/1965 | United Kingdom. |
| 1124493 | 8/1968 | United Kingdom. |
| 1169778 | 11/1969 | United Kingdom. |
| 2011609A | 7/1979 | United Kingdom. |

OTHER PUBLICATIONS

Mahlo Sales Brochure for "Orthomat Straightening Unit".
Seiren Electronics Company Ltd., Sales Brochure for "Densimatic Automatic Weft Bend Detector/Rectifier".
Mount Hope Machinery Company, "Instruction Manual 11908D890 B, Weftrol Models C & H, Dowed and Skewed Weft Straightener with Electro-Mechanical Automatic Controls Type TNP-4", (1975).
Mount Hope Division of SW Industries, Inc., brochure for "Weftrol. Automatic Multiple Detector Bowed & Skewed Weft Straightener", (1976).

Primary Examiner—Vincent P. McGraw
Attorney, Agent, or Firm—Kenway & Jenney

[57] ABSTRACT

An optical sensing system that detects the angular orientation of weft threads in a moving web of a textile has a sensor array that receives light transmitted through the web from a light source. A first lens system forms a converging light beam of generally uniform intensity directed at a normal to the web. A second lens system focuses the portion of the beam transmitted through the web onto the sensor array. Both lens systems can each consist of a single, circular, plano-aspheric lens. The second lens is preferably movable with respect to the sensor array to adjust the magnification of this system and has a low f number. The sensor array is preferably a single monolithic chip that includes a radial pattern of photosensitive areas that each generate an electrical signal proportional to the total intensity of the light incident on the area. The areas are elongated and narrow so the moving shadow of a weft thread passing over the area will modulate the output signal. The modulation is strongest when the thread is generally aligned with the area. Electronic circuitry generates a DC signal associated with each area that is proportional both to the magnitude and frequency of the modulation of the signal. The circuitry also compares these signals, selects the largest one, and generates an analog output voltage characteristic of the area associated with the largest signal. The circuitry optionally further includes a feedback circuit responsive to the selected maximum signal which controls a variable power supply for the light source and a switched gain amplifier responsive to extremes of light source voltage level.

28 Claims, 6 Drawing Figures

OPTICAL SENSING SYSTEM FOR DETERMINING THE ANGULAR ORIENTATION OF WEFT THREADS

BACKGROUND OF THE INVENTION

This invention relates in general to textile processing or manufacturing equipment. More specifically, it relates to an optical sensing system to determine the angular orientation of weft threads in a moving web of a textile.

As is well known, it is important in the manufacture of many textiles to ensure that the weft threads are substantially straight and perpendicular to the longitudinal or warp threads. In modern, high speed textile manufacturing machines, it is essential to have a system that automatically senses the orientation of weft threads and in response generates a control signal for mechanisms which can correct the two major types of irregularities, skewed and bowed threads. To correct skewing, the axis of rotation of a pair of straight rolls is shifted to adjust the relative travel speeds of the web selvages. To correct bowing, a pair of bowed rolls are rotated to advance or retard the speed of the central portion of the web with respect to both selvages. In practice, the quality and cost of the textile is directly dependent on the sensitivity and reliability of the sensing system.

A wide variety of optical sensing systems are known. In general they direct a beam or beams of light through the textile and utilize photodetectors to receive and convert the light into an electrical control signal for the straightening rollers. For example U.S. Pat. Nos. 2,106,611; 2,106,612; 2,196,893; 2,209,220; 2,492,737, and 2,623,262, all assigned to the General Electric Company, describe optical weft detection systems utilizing rotating chopping disks, inclined slots, rotating rectangular beams of light and other arrangements to sense the orientation of weft threads and convert this information into an electrical signal. The signal may be a voltage, as in the '737 and '262 patents, or a frequency, as in the '611, '612, and '893 patents. The '612 patent, for example, interrogates the web with two beams of light chopped by a slotted rotating drum that surrounds the light source. A cylindrical lens focuses the chopped beams onto two fixed, mutually inclined slots. A photodetector on the opposite side of the web from both the slots and the light source measures the differences in the frequency of the transmitted light. This difference is indicative of the orientation of the weft threads.

U.S. Pat. No. 3,077,656 to Mahlo describes a more recent optical sensor. It employs two mutually inclined slots formed in a sensing head located on the opposite side of the web from a light source. The slot widths are approximately equal to the width of a thread. The light transmitted through a slot generates a maximum signal on a photosensitive plate located behind the slot when the weft threads are aligned with the slot. The frequency of the resulting electrical signal is not important. Measurement of the signals at both slots indicates the weft thread orientation. One major difficulty with this system is that it is not highly accurate. A particular problem is that the system may have a "dead spot"; that is, it will not accurately define the angle of weft threads having a range of angular orientations intermediate those of the slots. To reduce this problem, a more recent model employs four slots with a closer angular separation. As before, each slot feeds light to a single cylindrical lens which focuses the light on a photosensitive plate.

Even with the additional slots, the Mahlo system is not effective for what can be termed "difficult" fabrics; that is, ones where the fabric is sufficiently dense that light will not penetrate it, where the thread pattern is highly irregular, or where the thread size or thread count per inch is at an extreme value. To attempt to deal with these fabrics, yet another Mahlo system utilizes a rotating scanning head with a single slot. Correlation between the angular position of the head and the signal generated by the light passing from the fabric through the slot gives an indication of the weft thread orientation. While this system may provide more precise information than fixed head systems, it has maintenance and cost disadvantages associated with rotating elements and the necessity of measuring and correlating the position of the rotating member with the output signal.

Another optical system described in Japanese Publication Document No. 88382 utilizes a screen that carries a set of gratings or line patterns. The gratings in a column of the screen correspond to a given weft thread count per inch. Within each column, each grating has a different "pitch" or angle of inclination. The illuminated thread pattern projected on a column of the gratings creates a series of moire patterns. One pattern is characteristic of the weft threads being aligned with the grating. This system has the disadvantage that the operator must determine the thread count and make corresponding adjustments to select the proper column. This system is therefore not fully automatic. It is also susceptible to error in making the initial thread count. If the thread count is incorrect to any significant degree, the moire pattern is likely to disappear.

It should be noted that all optical systems must operate in a high "noise" environment, that is, signals due to naturally occurring irregularities in the size and direction of the weft threads, variations in the thread count, variations in the fabric travel speed, and large magnitude variations due to large irregularities in the fabric. Optical systems also frequently generate errors due to aging of components of the system, particularly the light source.

In contrast to the foregoing optical systems, the assignee of the present invention has developed a mechanical system for detecting the orientation of weft threads. It utilizes a pivoted sensing head with wheels that engage a moving textile web. The assembly pivots in response to variations in the cloth that correlate with the lay of the weft threads. This mechanical system is highly sensitive and has proven to be reliable for a wide range of fabrics, including dense fabrics such as corduroy, denim, and terry which cannot be handled by an optical system. The mechanical sensor, however, may not perform as well when the textile has variations in its cross machine elasticity or on complex fabrics such as ones having a series of longitudinal cables or braids linked laterally by loose patterns of threads.

It is therefore a principal object of this invention to provide an optical sensing system that accurately and reliably determines the angular orientation of weft threads including weft threads in complex or difficult fabrics.

Another object of the invention is to provide an optical sensing system with the foregoing advantages that also has a good angular sensitivity with no dead spots.

Another significant object of the invention is to achieve accurate and reliable weft angle detection with no mechanical scanning arrangement and its attendant cost and maintenance problems.

Still another object of the invention is to provide an optical sensing system that does not rely on optical interference effects and is not sensitive to variations in the thread count.

A further object of the invention is to provide an optical sensing system that accepts and automatically inspects fabrics with a wide range of thread counts moving over a wide range of web speeds.

A still further object is to provide a sensing system that is substantially insensitive to large but non-recurring variations in the fabric.

Yet another object of the invention is to provide a sensing system that automatically accommodates for variations in the characteristics of the fabric and variations in the sensing system itself.

Another object is to provide an optical sensing system utilizing simple, low cost optical components.

SUMMARY OF THE INVENTION

An optical sensing system according to the present invention has a light source and a detector head usually located on opposite sides of a moving web of a textile. The light source, which preferably includes an optical focusing element, directs a converging light beam of generally uniform intensity onto the web. The detector head includes an optical system which focuses the light transmitted through the web onto a sensor array that has a pattern of photosensitive areas on one face. The areas are in a radial array with the central area of the array generally aligned perpendicular to the direction of advance of the web. Each area has a width generally comparable to that of the weft threads in the web as imaged by the detector head lens, and a length sufficient to provide a good signal-to-noise ratio along with a reasonable angular response pattern. In the preferred form, the array is formed on an n-doped silicon chip with the areas formed by diffusion of a p material. Also in the preferred form, there are approximately twelve areas each having an angular separation of approximately $2\frac{1}{2}°$ with respect to adjacent areas.

Each area produces an electrical signal which is proportional to the total intensity of the light incident on that area. The signal is also modulated by the shadow of the thread. This modulation is very strong when a weft thread is generally aligned with an area. Electronic circuitry processes the electrical signals generated by the areas to produce a final analog output voltage that is indicative of the angular orientation of the weft threads passing by the sensor array. The circuitry includes an AC charge detector associated with each area that produces a DC output voltage that is proportional both to the magnitude and frequency of the modulation of the signal from the area. A selector circuit compares these DC output signals, selects the largest signal, and produces an output voltage characteristic of the sensor array area which produced the largest signal. If there are two DC input signals to the selector of approximately equal magnitude, the selector circuit averages them and produces an output voltage indicative of a region, and hence an angular orientation, that is intermediate the areas which produced the strongest signals. The automatic interpolation provided by this averaging coupled with A SMALL "jitter" effect created by thread-to-thread variations yields an angular sensitivity of approximately $\frac{1}{2}°$ despite the fact that the areas are separated by $2\frac{1}{2}°$.

In the preferred form, the sensing system also includes a feedback circuit responsive to the selected maximum signal which controls a variable power source for the light source followed by a switched gain amplifier for each signal processing channel. This automatic variation in gain and light intensity compensates for changes in the textile density, travel speed and intensity of the light source. To optimize performance over a wide range of weft thread count per inch, the optical imaging lens and sensor array are preferably movably mounted to provide a variable magnification of the shadow pattern of the threads on the sensor array. The imaging lens and the condensing lens can be single lens elements that are plano-aspheric. The focusing lens preferably is characterized by a low f number.

These and other features and objects of the invention will become apparent from the following detailed description which should be read in conjunction with the accompanying drawings.

DETAILED DESCRIPTION OF THE PREFERRED EMBODIMENTS

Figure 1:
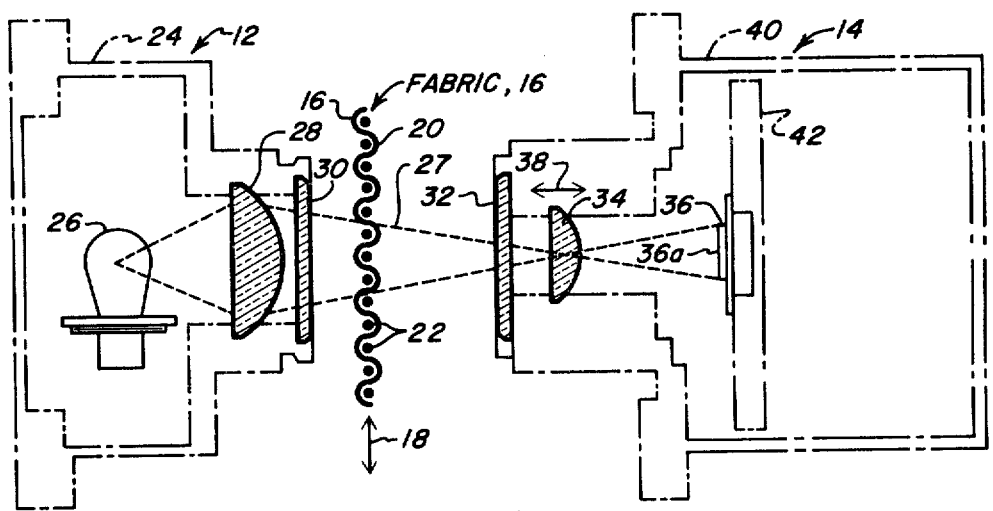
FIG. 1 is a simplified view in section of a light source and detector head according to the present invention.

FIG. 1 shows a light source 12 and a sensing or detector head 14 according to the present invention which are mounted in optical alignment and on opposite sides of a web 16 of a woven fabric having warp threads 20 aligned generally in the direction of the arrow 18 and weft threads 22 aligned generally perpendicular to the warp threads. The web is often wet and at a stage of production where it is about to enter a tenter or printer. The quality of the final textile product is in part dependent on the degree to which the weft threads are mutually parallel and perpendicular to the warp threads. The weft straightening machinery will typically include a pair of straight rolls (not shown) which can be adjusted to correct a skew condition of the weft threads and a pair of bowed rolls (not shown) which can be rotated to correct a bow condition in the weft threads.

A significant advantage of the present invention is that the fabric 16 can have a weft thread count ranging from less than 4 to more than 140 threads per inch. The fabric can also have variations in its cross machine elasticity characteristic of fabrics with longitudinal cables or braids. Further, the fabric can travel at any of a wide variety of speeds including relatively high speeds associated with economical textile production. The fabric, however, must be sufficiently loosely woven that it will transmit a portion of a high intensity light beam incident on the fabric.

The light source 12 includes a housing 24 that encloses a lamp 26 that produces a generally uniform, high intensity light directed at least in part at a condensing lens 28 also secured in the housing 24. The lamp 26 preferably produces light having maximum output at a wavelength in the range of 700 to 900 nm to reduce scattering. A glass face plate 30 adjacent the lens 28 encloses the housing 24 but does not contribute to shaping the light beam. The condensing lens 28 is preferably plano-aspheric and designed to collect and concentrate the light emitted by the lamp 26 into a beam 27 that is generally perpendicular to and incident upon the moving web 16. The beam 27 has a generally even cross sectional distribution of light intensity. The lens 28 is circular as opposed to cylindrical.

At any instant, the light beam 27 creates a pattern of light and shadow areas on the opposite side of the fabric. In particular, the weft threads 22 produce a pattern of shadows that are, in general, mutually parallel and evenly spaced. The beam of transmitted light carrying this positional information concerning the weft threads enters the detector head 14 through a transparent front plate 32 and is brought to focus on a sensor array 36 by an imaging lens 34. The imaging lens 34 is preferably mounted for translation along its optical axis as indicated by the arrow 38. Translation of the lens 34 provides for various magnifications of the shadow pattern incident upon the sensor array 36. A housing 40 of the detector head supports a plate 42 which is also movable within the housing in the direction of the arrow 38 in conjunction with movement of the lens 34. The sensor array 36, in turn, is mounted on the plate 42. Different magnifications allow the sensing system of the present invention to accommodate, in part, for large variations in the thread count of the fabric under inspection. The imaging lens 34, like the condensing lens 28, is circular and preferably a single, plano-aspheric lens element. The imaging lens 34 is characterized by a low f number, a typical value being 1.6. It should be noted that while the sensing system of this invention has a variable magnification capability, it is used only to accommodate extreme variations in the thread count. In normal use, the sensing system of the present invention requires no mechanical adjustment for variations in thread count.

A principal feature of the present invention is the sensor array 36 and in particular its planar face 36a facing the lens 34 which includes a pattern or array of photosensitive areas 44. Each area 44 is operationally independent of other such areas and acts as a photodiode to generate an electrical signal, a current, which is proportional to the total intensity of the light incident upon the area. Metallized connection strips 45 deposited on the sensor array provide independent electrical connection to each area 44. The areas 44 each have a generally elongated and narrow rectangular configuration. The longitudinal axis of each area 44 is disposed generally transversely to the direction of advance of the web. The width of each area is selected so that it is roughly comparable to the width of one of the weft threads 20, or more precisely, its shadow as generated and projected onto the array 36 by the light source 12 and the optical elements in the detector head 14.

Because, in part, the weft threads are not highly uniform in their size, cross-sectional shape or orientation (there is almost always a substantial degree of "jitter" in the direction of any weft thread), there is a substantial degree of background noise in the electrical signal produced by the areas of the sensor array. The length of the area is important for a good signal-to-noise ratio. However, an extremely long area results in an angular response that is unacceptably narrow.

Figure 4:
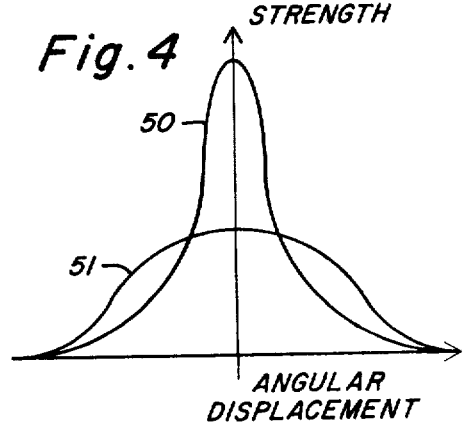
FIG. 4 is a graph of the sensed signal of an optical sensing system according to this invention as a function of the thread angle for two different area lengths.

FIG. 4 shows the general relationship between the signal output of an area 44 for two different lengths. A long, narrow area produces a comparatively sharp signal peak 50 which is distinguishable from the general noise level in the system. On the other hand, a shorter area produces a less pronounced signal peak 51 which is characterized by an overall lower amplitude and a larger signal pattern width. A recommended length-to-width ratio for an area 44 is approximately 35 to 1. This ratio can provide a signal-to-noise ratio in the range of 2:1 to 3:1, together with a signal pattern width of approximately 6° angle which is appropriate to the $2\frac{1}{2}°$ spacing of the areas 44. More generally, the angular width of the final signal generated by any area 44 should be at least twice the angular separation between adjacent areas 44.

Figure 2:
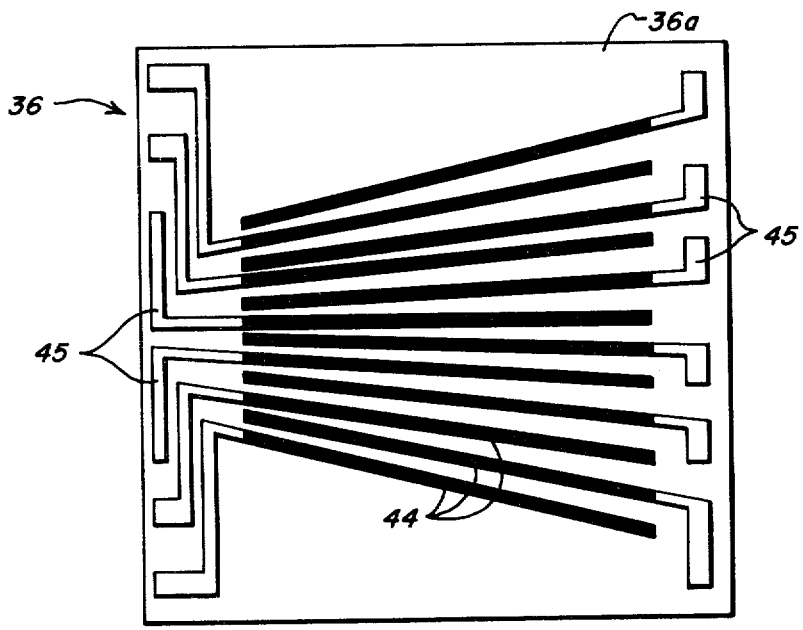
FIG. 2 is a top plan view of the sensor array of FIG. 1 showing the photosensitive areas.

The areas 44 are positioned in a radial array on the surface 36a. The center line of the array is oriented substantially perpendicular to the direction of advance of the web. The sensor array 36 of the present invention is characterized by a comparatively large number of areas 44 which have a comparatively small angular separation. In the preferred form shown in FIG. 2, the sensor array includes twelve areas 44 which are each separated from an adjacent area by $2\frac{1}{2}°$. As will be discussed in greater detail below, this array has been found to provide precise and reliable information concerning the angular orientation of the weft threads 22. More specifically, when used in the sensing system of the present invention, this array can provide information as to the angular orientation of the weft threads that is accurate to approximately $\frac{1}{2}°$, whereas the areas 44 are each separated by an angle five times greater.

As the weft threads 22 pass between the light source 12 and the detector head 14, they each cast a moving "line" shadow on the sensor array 36. The shadow has an angular orientation corresponding to that of the thread. As the shadow passes over the face 36a of the sensor array, it causes varying degrees of modulation of the output signal of the areas 44. In general, an area 44 which is aligned or substantially aligned with the weft threads and their shadows will undergo a large modulation because the area rapidly changes between a state where it is substantially illuminated and a state where it is substantially darkened (a "venetian blind" effect). This modulated output signal of the area 44 can be processed according to the invention to yield the desired positional information concerning the threads as well as a suitable electrical control signal for the skew and bow rolls which can correct any sensed irregularities. (In practice, there are usually multiple detector head-light source pairs spaced across the web. The several final output signals are compared using standard techniques such as those currently employed in the weft detection and correction system sold by the Mount Hope Machinery Company under the trade designation "WEFTROL.")

The number and angular separation of the areas 44 are chosen to sense a reasonably large angular range about the center point of the array while at the same time providing good sensitivity, avoiding what is commonly termed a "dead spot" between areas, and utilizing as few areas as possible to control cost. As noted above, an array of twelve areas each separated by 2¼° meets all of these objectives.

Figure 3:
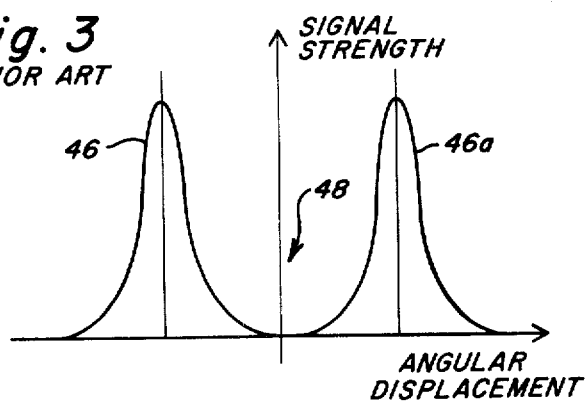
FIG. 3 is a graph showing the signal of a prior art two-channel optical sensor plotted as a function of the thread angle and demonstrating the "dead spot" problem.

The "dead spot" problem characteristic of certain prior art systems is illustrated by FIG. 3 for a two-channel detector. There are electrical output signals 46 and 46a generated by the two slots. Each slot can detect variations over a given range, typically 4° with a weft count of 40 threads per inch, about its fixed angular orientation. When the angular separation of the fixed slots itself exceeds the range of sensitivity of the slots, there is a "dead spot," indicated generally by the area 48 in FIG. 3, where a weft thread having an angular orientation corresponding to the dead spot will not produce a positive output signal at either fixed slot. It should be noted that there is a trade-off between the dead spot problem addressed by FIG. 3 and the signal width depicted in FIG. 4.

Figure 5:
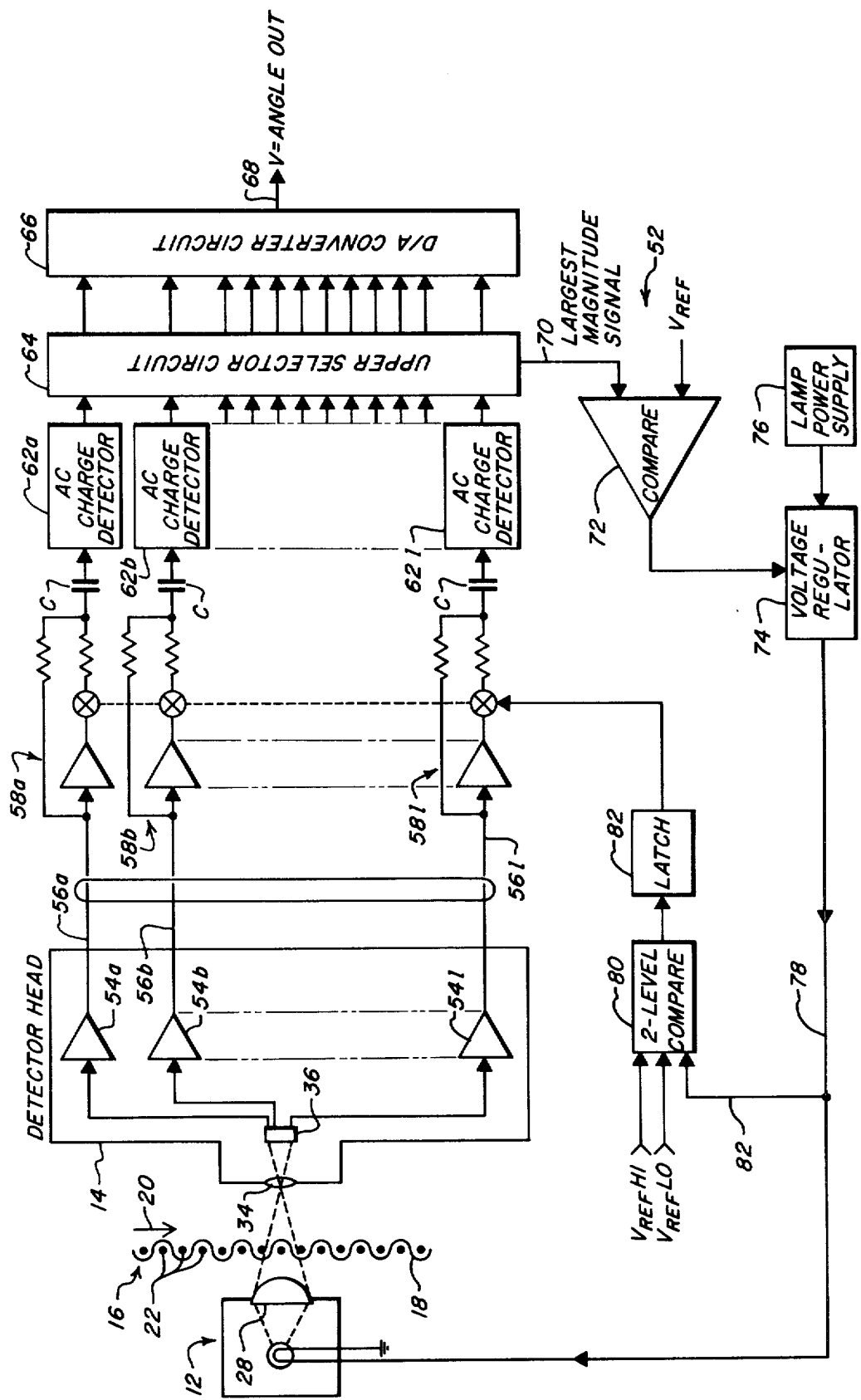
FIG. 5 is a schematic diagram of the complete optical sensing system according to the invention including a highly simplified view of the element shown, in FIG. 1, as well as the associated electronic circuitry.

FIG. 5 shows in schematic form a complete optical sensing system 52 according to the present invention with particular emphasis on the electronic circuitry which processes the electrical signal outputs of the areas 44 on the sensor array 36. As shown there, the detector head includes a series of preamplifiers 54a, 54b . . . 54l, each associated with one of the areas 44. The preamplifiers 54 are trimmed so that the output signal for each of the associated areas over the corresponding lines or channels 56a, 56b . . . 56l are substantially the same for a substantially identical intensity of light incident on the areas 44. The preamplifiers 54 convert the current signal output of the sensor array into amplified voltage outputs that are then applied to switched gain amplifiers 58a, 58b . . . 58l, each associated with one of the channels 56a . . . 56l. In the preferred form, the amplifier gain can be switched to one of two levels preferably having a difference in gain in the range of 20:1. The particular gain selected, e.g. 20 or 1, usually depends on the type of fabric being scanned and the speed of the fabric.

The output signals of the switched gained amplifiers are each supplied through a coupling capacitor C to a separate AC charge detector 62a, 62b . . . 62l. The detectors 62 produce a DC voltage output signal whose amplitude is a generally linear function of both the amplitude of the input signal and the frequency of the signal. A major advantage of the detectors 62 is that in demodulating the input signal, they provide good signal-to-noise characteristics. More specifically, the detectors 62 discriminate against errors or noise signals which may be large, but occur at a comparatively low rate. Thus, for example, if there is a tear or small irregularity in the fabric which totally blocks the passage of light, the amplitude of the signal generated at one or more of the areas 44 may be an extreme value. However, because the irregularity is not repeated at a high rate, the frequency is low and that component of the DC output of the detectors 62 will be low. Thus the DC output voltage of the detectors 62 associated with the irregularity will not be so large as to overwhelm the output signals of the other channels. More generally, because of the heavy weighting given to the frequency and strength of the modulation, the detector associated with the channel (and therefore the area 44) which is most closely aligned with the weft threads 22 passing over the detector head will typically produce the largest DC output signal.

The output signals from the AC charge detectors 62 are filtered and applied to an upper selector circuit 64 which is essentially a multiple input comparator circuit that selects the output signal having the largest magnitude. It should be noted that the upper selector circuit does not compare the output signals of the detector 62 to a fixed reference voltage, but rather to one another. It is also significant that the selector circuit 64 will select more than one channel as having the "largest" signal if two or more signals are larger than the others and reasonably close to one another in magnitude. One possible configuration for the upper selector circuit is a set of transistors which each have the output signal of one of the DC charge converters 62 applied to its base, all emitters common and fed a current, and each collector used as a current output.

Figure 6:
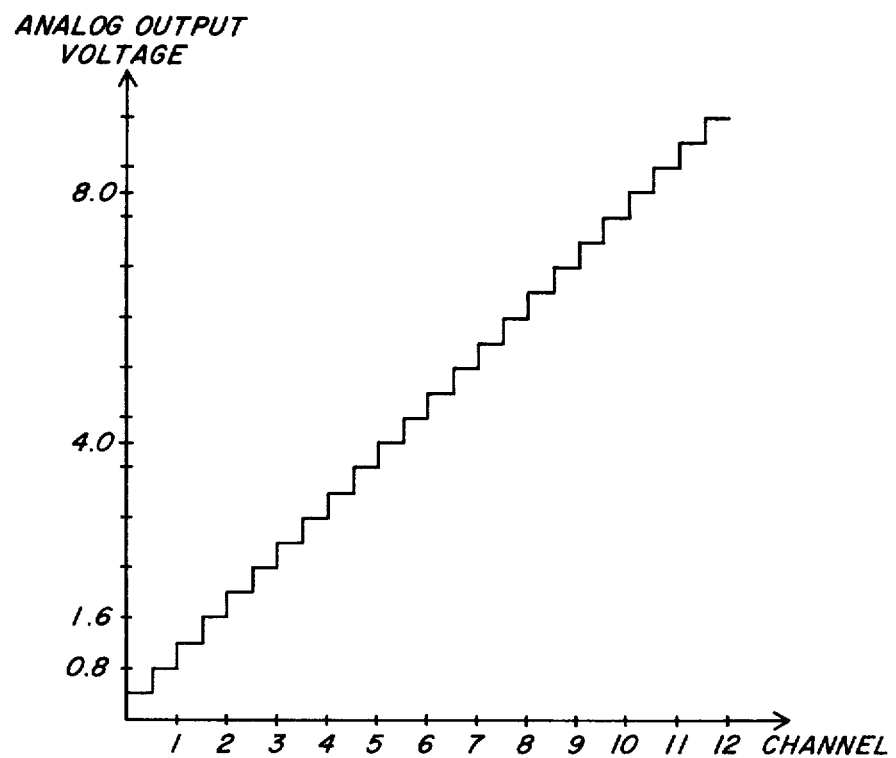
FIG. 6 is a graph showing the analog output voltage of the optical sensing system shown in FIG. 5 for each of the twelve channels of the system.

The output of the upper selector circuit 64 is then applied to a digital-to-analog converter circuit 66 which converts the basically digital information (which channel or channels carries the "largest" signal) into a final output voltage which is characteristic of the channel, and therefore the area 44, which generated that largest signal. FIG. 6 represents a graph of the analog output voltage of the converter circuit 66 as a function of the twelve channels, 56a . . . 56l. One possible arrangement for the circuit elements of the converter circuit 66 includes a set of resistors of equal value connected in series to act as a step function voltage divider, a set of independant electronic switches, and a set of equal valued adding resistors. The output voltage of each step of the divider is connected to the input of an electronic switch which in turn is controlled by the output of the upper selector circuit 64. The output of each switch feeds an adding resistor which connect together to produce a final analog output voltage on line 68.

By way of illustration, each channel can be represented by a 0.8 volt analog output increasing as a step function. As can be seen from FIG. 6, there are also steps intermediate those of the channels. If the upper selector circuit selects two substantially equal "largest" signals, then the analog output voltage is averaged to yield a value midway between those of the two selected channels. The final analog output voltage signals on line 68 is preferably filtered before it is applied to a control circuit that adjusts the position of the aforementioned skew and bowed rolls. It should also be noted with this system that any "jitter" in the weft yarns (that is, flaws or random fluctuations in the position of the weft yarn) will lead to a series of differing output voltages which can be averaged to provide more precise information concerning the average angular location of the weft threads. This "dynamic" averaging over time results in angular sensitivities of approximately ¼° when the areas 44 are each separated by 2¼°.

The output signal of the upper selector circuit is also applied over line 70 to a feedback control circuit which includes a comparator circuit 72 that compares the largest magnitude signal to a fixed reference voltage. The output of the comparator is applied to a voltage regulator 74 controlling the output of a power supply 76 connected to the lamp 26 over line 78. The comparator forces the amplitude of the signal on the line 70 toward the reference voltage. In particular, if the magnitude of the signal is lower than a determined level, the comparator circuit will cause the voltage regulator to supply additional power to the lamp 26 to increase the intensity of the illumination incident upon the fabric 16. This, in turn, will cause an increase in the intensity of the transmitted light incident upon he array 36, and a larger output at line 70.

The feedback circuit also includes a comparator 80 which monitors the voltage supplied to the light source over the line 82 and compares it to fixed high and low reference voltages. If the voltage over the line 82 exceeds the high reference voltage, the strength of the signal being processed by the circuitry of the detection system is low. This causes the comparator to activate a latch 82 which switches the gain of the amplifiers 58a . . . 58l to a higher level. This feedback system is particularly useful in automatically compensating for variations in the signal magnitude resulting from changes in web velocity past the detector head, weft thread count per inch, and the efficiency of lamp 26. The feedback circuit makes a compensating adjustment in the power supplied to the lamp 26, which may also include an adjustment in the gain introduced by the amplifiers 58. It should also be noted that the feedback circuit will also automatically compensate for aging in the components of the sensing system 52, particularly the lamp 26. Typically, aging of the lamp 26 can result in a decrease in its high intensity output on the order of 50%. The optical sensing system of the present invention will automatically and continuously adjust for this aging process.

By way of illustration but not of limitation, the sensor array 36 is preferably a monolithic silicon p on n bipolar, planar integrated circuit chip. The p material is applied by diffusion into an n doped silicon substrate. For a twelve area sensor array with the areas having an angular separation of approximately 2½°, suitable dimensions for the areas are a length of 0.280 inch and a width of approximately 0.008 inch. A typical overall dimension for the chip of the sensor array is approximately 0.38 inch square. Because of the small dimensions of the sensor array, it is possible for the optical elements of the sensing system to be single and circular rather than multiple and cylindrical as, for example, in a Mahlo system. Use of circular optical elements results in manufacturing cost savings. Another advantage of a small, monolithic sensor array is that the areas 44 have generally the same response to changes in environmental conditions such as temperature.

While the invention has been described with reference to a sensing system used to control weft straightening machinery during production, this invention can also be used to inspect dry, fully processed textiles. Also, while the invention has been described with the light source and the detector head on opposite sides of the web, it is also possible for certain fabrics to position them on the same side of the web. With this arrangement the detector head is responsive to light reflected from the weft threads, not light transmitted through the threads. For the purpose of this specification, therefore, "transmitted light" is taken as including light which is either in fact transmitted or light which is reflected. Still other variations include the use of different numbers of areas 44, areas with different geometries and angular separations (including non-uniform separations), and a sensor array which is formed of photosensitive elements that are not doped areas on a single semiconductor chip.

While the invention has been described with reference to its preferred embodiment, various modifications and alterations including those discussed above will become apparent to those skilled in the art from the foregoing description and drawings. Such modifications and variations are intended to fall within the scope of the appended claims.

What is claimed and desired to be secured by Letters Patent is:

1. In a system for sensing the angular orientation of weft threads in a web that is moving in a first direction, said system including a light source that directs light onto the web and optical means for forming an image of the weft threads generated by transmitted light from said light source, the improvement comprising,
    a sensor array disposed to receive said transmitted light image on a face thereof, said face including a plurality of elongated, narrow photosensitive areas that are radially aligned with respect to one another, each of said areas generating an electrical signal that is responsive to the total intensity of said transmitted light incident upon it, the width of each of said areas being generally uniform and selected so that the movement of said weft threads past said array which are substantially aligned with one of said areas produces a detectable degree of modulation of said electrical signal, and the length of each of said areas being selected to provide a good signal-to-noise ratio for said electrical signal, said sensor array comprising a semiconductor chip with said areas being regions that are doped with a material that causes each said area to function as a photodiode.

2. The sensor array of claim 1 wherein said semiconductor chip is an n-doped silicon and said material is a p-material.

3. The sensor array of claim 1 wherein said width of said areas is generally comparable to the width of one of said weft threads.

4. The sensor array of claim 1 wherein said areas have a mutual angular separation in the range of 1 to 5 degrees.

5. The sensor array of claim 1 wherein said areas each have a length to width ratio of approximately 35 to 1.

6. The sensor array of claim 1 wherein said signal-to-noise ratio is in the range of 2:1 to 3:1.

7. The sensor array of claim 1 further comprising means for establishing independent electrical connection with each of said areas.

8. In a system for sensing the angular orientation of weft threads in a web that is moving in a first direction, said system including means for generating a plurality of modulated electrical signals whose strength of modulation corresponds to the angular orientation of said weft threads, and signal processing means wherein the improvement comprises,
    first circuit means having a plurality of channels each responsive to an associated one of said modulated signals and each generating a first output signal that is representative of both the magnitude and the frequency of said modulation such that an increase in said magnitude or said frequency produces a corresponding increase in said output signal, and
    means for selecting the largest of said output signals from said first circuit means and generating a second output signal that is characteristic of the angular orientation of said weft threads with respect to said first direction.

9. The signal processing means of claim 8 wherein said modulated signal is an AC current and said first output signal is a DC voltage.

10. The signal processing means of claim 8 wherein said selecting means further includes means for averaging said second output signals when said first two output signals of any two of said channels are generally of equal magnitude.

11. The signal processing means of claim 8 wherein said first circuit includes a switched gain amplifier and further comprising a feedback circuit responsive to said second output signal that controls said switched gain amplifier to accommodate automatically for variations in the general level of intensity of said light incident upon said sensor array.

12. The signal processing means of claim 11 further comprising a variable power source for said light source and wherein said feedback circuit controls the output of said power source to vary the intensity of said light source.

13. Apparatus for sensing the angular orientation of weft threads in a textile web that is moving in a first direction generally perpendicular to the weft threads, comprising
   a light source that directs light onto said web,
   a sensor array disposed to receive light transmitted from the web and including a plurality of elongated, narrow photosensitive areas that are radially aligned with respect to one another, each of said areas generating an electrical signal that is responsive to the total intensity of said light incident upon it, the width of each of said areas being selected to that the movement of said weft threads past said array which are substantially aligned with one of said areas produces a detectable degree of modulation of said electrical signal,
   first circuit means having a channel responsive to each of said electrical signals which generates an output signal for each of said channels that is representative of the magnitude and frequency of said modulation, and
   means for selecting the largest of said output signals from said first circuit means and generating a second output signal that is characteristic of the angular orientation of said weft threads with respect to said first direction.

14. Sensing apparatus according to claim 13 wherein each of said areas has a width generally comparable to the width of one of said weft threads and a length that provides a good signal-to-noise ratio for said electrical signal and a signal width at least twice the angular separation of adjacent ones of said areas.

15. Sensing apparatus according to claim 14 wherein said areas have a predetermined, mutual angular separation that in conjunction with the dimensions of said area avoids dead spots between any two adjacent ones of said areas.

16. Sensing apparatus according to claim 13 wherein said selecting means further comprises means for averaging said second output signals when said first output signals of any two of said channels are generally of equal magnitude and larger than any other of said first output signals.

17. Sensing apparatus according to claim 13 wherein said first circuit includes a switched gain amplifier and further comprising a feedback circuit responsive to said second output signal that controls said switched gain amplifier to accommodate automatically for variations in the general level of the intensity of said light incident upon said sensor array.

18. Sensing apparatus according to claim 17 further comprising a variable power source for said light source and wherein said feedback circuit controls the output of said power source to vary the intensity of said light source.

19. Sensing apparatus according to claim 13 wherein said light source includes a lamp and a condensing lens means that provides a beam of light incident upon said web having a generally uniform intensity and oriented generally perpendicular to said web.

20. Sensing apparatus according to claim 19 further comprising lens means for focusing the light transmitted from said light source through said web onto said sensor array.

21. Sensing apparatus according to claim 20 wherein said condensing and focusing lens means each comprise at least one circular lens element.

22. Sensing apparatus according to claim 21 wherein said focusing lens element is characterized by a low f number.

23. Sensing apparatus according to claim 21 wherein said focusing and condensing lens elements are planoaspheric.

24. Sensing apparatus according to claim 13 wherein said sensor array is located on the opposite side of said web as said light source and is responsive to light which passes through said web.

25. Sensing apparatus according to claim 13 wherein said sensor array is located on the same side of the web as said light source and is responsive to reflected light.

26. Sensing apparatus according to claim 20 wherein said focusing lens means includes means for adjusting the magnification of said focusing lens to vary the size of the image of the weft threads on said sensor array.

27. Sensing apparatus according to claim 26 wherein said magnification adjustment means comprises means for translating said focusing lens means along an axis from said light source to said sensor array.

28. Sensing apparatus according to claim 27 further comprising means for adjusting the position of said sensor along said axis in conjunction with the adjustment of said focusing lens means to maintain said weft thread image in focus.

* * * * *